United States Patent
Huang et al.

(10) Patent No.: US 10,474,160 B2
(45) Date of Patent: *Nov. 12, 2019

(54) HIGH RESOLUTION 3D POINT CLOUDS GENERATION FROM DOWNSAMPLED LOW RESOLUTION LIDAR 3D POINT CLOUDS AND CAMERA IMAGES

(71) Applicant: Baidu USA LLC, Sunnyvale, CA (US)

(72) Inventors: Yu Huang, Sunnyvale, CA (US); Hsien-Ting Cheng, Sunnyvale, CA (US); Jun Zhu, Sunnyvale, CA (US); Weide Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 15/641,100

(22) Filed: Jul. 3, 2017

(65) Prior Publication Data

US 2019/0004533 A1 Jan. 3, 2019

(51) Int. Cl.
*G06K 9/00* (2006.01)
*G05D 1/02* (2006.01)
(Continued)

(52) U.S. Cl.
CPC .......... *G05D 1/0248* (2013.01); *G01S 7/4808* (2013.01); *G01S 17/023* (2013.01);
(Continued)

(58) Field of Classification Search
CPC .... G05D 1/0248; G05D 1/0088; G01S 17/89; G06T 11/60; G06T 7/55; G06T 2207/10028; G06K 9/6269; H04N 5/23238
(Continued)

(56) References Cited

U.S. PATENT DOCUMENTS 6,990,243 B1 * 1/2006 Kuniba ............... H04N 1/41
375/E7.13
2007/0177809 A1 * 8/2007 Takahashi .......... H04N 5/232
382/232
(Continued)

OTHER PUBLICATIONS

Laina et al., "Deeper Depth Prediction with Fully Convolutional Residual Networks", IEEE International Conference on 3D Vision, Sep. 19, 2016.
(Continued)

*Primary Examiner* — Van D Huynh
(74) *Attorney, Agent, or Firm* — Womble Bond Dickinson (US) LLP

(57) ABSTRACT

In one embodiment, a method or system generates a high resolution 3-D point cloud to operate an autonomous driving vehicle (ADV) from a low resolution 3-D point cloud and camera-captured image(s). The system receives a first image captured by a camera for a driving environment. The system receives a second image representing a first depth map of a first point cloud corresponding to the driving environment. The system downsamples the second image by a predetermined scale factor until a resolution of the second image reaches a predetermined threshold. The system generates a second depth map by applying a convolutional neural network (CNN) model to the first image and the downsampled second image, the second depth map having a higher resolution than the first depth map such that the second depth map represents a second point cloud perceiving the driving environment surrounding the ADV.

20 Claims, 19 Drawing Sheets

(51) Int. Cl.

| | |
|---|---|
| *G06T 3/40* | (2006.01) |
| *G06T 7/55* | (2017.01) |
| *G06K 9/62* | (2006.01) |
| *H04N 5/232* | (2006.01) |
| *G06T 11/60* | (2006.01) |
| *G05D 1/00* | (2006.01) |
| *G01S 17/89* | (2006.01) |
| *G01S 17/02* | (2006.01) |
| *G01S 7/48* | (2006.01) |
| *G06K 9/46* | (2006.01) |
| *H04N 5/225* | (2006.01) |

(52) U.S. Cl.
CPC ............ *G01S 17/89* (2013.01); *G05D 1/0088* (2013.01); *G06K 9/00791* (2013.01); *G06K 9/4628* (2013.01); *G06K 9/6202* (2013.01); *G06K 9/6269* (2013.01); *G06K 9/6274* (2013.01); *G06T 3/40* (2013.01); *G06T 7/55* (2017.01); *G06T 11/60* (2013.01); *H04N 5/2258* (2013.01); *H04N 5/23238* (2013.01); *G06T 2207/10028* (2013.01)

(58) Field of Classification Search
USPC .......................................................... 382/104
See application file for complete search history.

(56) References Cited

U.S. PATENT DOCUMENTS

| | | | | |
|---|---|---|---|---|
| 2008/0131015 | A1* | 6/2008 | Imata | H04N 19/176 382/251 |
| 2018/0136332 | A1* | 5/2018 | Barfield, Jr. | G01S 17/42 |
| 2018/0188733 | A1* | 7/2018 | Iandola | G05D 1/024 |
| 2018/0307921 | A1* | 10/2018 | Vallespi-Gonzalez | G06K 9/00369 |
| 2018/0329066 | A1* | 11/2018 | Pacala | G01S 17/023 |

OTHER PUBLICATIONS

Godard et al., "Unsupervised Monocular Depth Estimation with Left-Right Consistency", Proceedings of the IEEE Conference on Computer Vision and Pattern Recognition, Apr. 12, 2017.

Knoebelreiter et al., "End-to-end training of hybrid CNN-CRF models for stereo", Proceedings of the IEEE Conference on Computer Vision and Pattern Recognition, May 3, 2017.

Cao et al., "Estimating Depth from Monocular Images as Classification Using Deep Fully Convolutional Residual Networks", University of Adelaide, Australia, May 8, 2016.

Mayer et al., "A large dataset to train Convolutional Networks for Disparity, Optical Flow, and Scene Flow Estimation", Proceedings of the IEEE Conference on Computer Vision and Pattern Recognition, Dec. 7, 2016.

Fischer et al. "FlowNet: Learning Optic Flow with Convolutional Networks", IEEE International Conference on Computer Vision, May 4, 2015.

Ummenhofer et al., "DEMON: Depth and Motion Network for Learning Monocular Stereo", Proceedings of the IEEE Conference on Computer Vision and Pattern Recognition, Apr. 11, 2017.

Žbontar and LeCun, "Stereo Matching by Training a Convolutional Neural Network to Compare Image Patches", The Journal of Machine Learning Research archive vol. 17 Issue 1, Jan. 2016, pp. 2287-2318.

Luo, Schwing, and Urtasun, "Efficient Deep Learning for Stereo Matching", Proceedings of the IEEE Conference on Computer Vision and Pattern Recognition, Jun. 27-30, 2016.

Newell, Yang, and Deng, "Stacked Hourglass Networks for Human Pose Estimation", European Conference on Computer Vision, Jul. 26, 2016.

Szeliski, "Image Alignment and Stitching: A Tutorial", MSR Report, Oct. 2004.

* cited by examiner

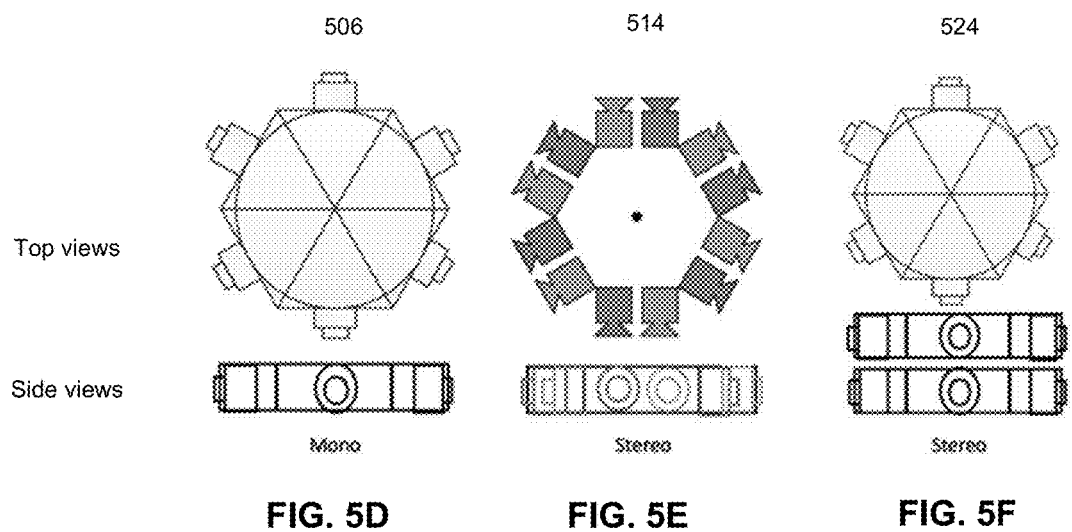

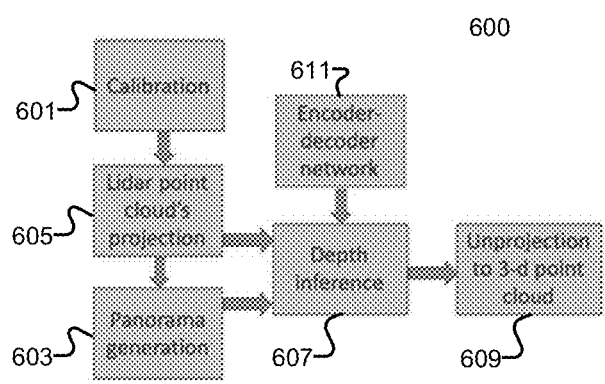 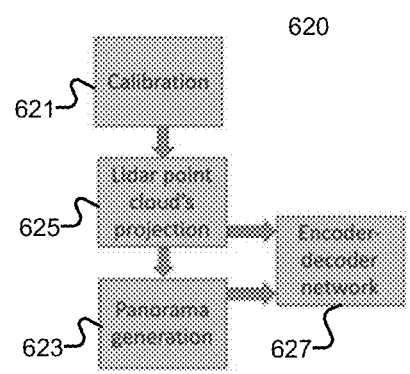
FIG. 6A  FIG. 6B

HIGH RESOLUTION 3D POINT CLOUDS GENERATION FROM DOWNSAMPLED LOW RESOLUTION LIDAR 3D POINT CLOUDS AND CAMERA IMAGES

RELATED APPLICATIONS

This application is related to co-pending U.S. Patent application Ser. No. 15/641,111, entitled "High Resolution 3-D Point Clouds Generation From Upsampled Low Resolution LIDAR 3-D Point Clouds and Camera Images," filed Jul. 3, 2017 and co-pending U.S. Patent application Ser. No. 15/641,113, entitled "High Resolution 3-D Point Clouds Generation Based on CNN and CRF Models," filed Jul. 3, 2017. The disclosure of the above applications is incorporated by reference herein in its entirety.

TECHNICAL FIELD

Embodiments of the present disclosure relate generally to operating autonomous vehicles. More particularly, embodiments of the disclosure relate to high resolution three dimensional (3-D) point clouds generation from downsampled low resolution light detection and range (LIDAR) 3-D point clouds and camera images.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

High resolution LIDAR data is important to realize real-time 3-D scene reconstruction for autonomous driving vehicle (ADV) applications such as object segmentation, detection, tracking, and classification. However, high resolution LIDAR equipment is generally expensive and may not be available.

BRIEF DESCRIPTION OF THE DRAWINGS

Embodiments of the disclosure are illustrated by way of example and not limitation in the figures of the accompanying drawings in which like references indicate similar elements.

FIGS. 5D-5F illustrate examples of mono/stereo panorama camera configurations according to some embodiments.

FIGS. 6A and 6B illustrate flowcharts of an inference mode and a training mode respectively according to one embodiment.

DETAILED DESCRIPTION

Figure 1:
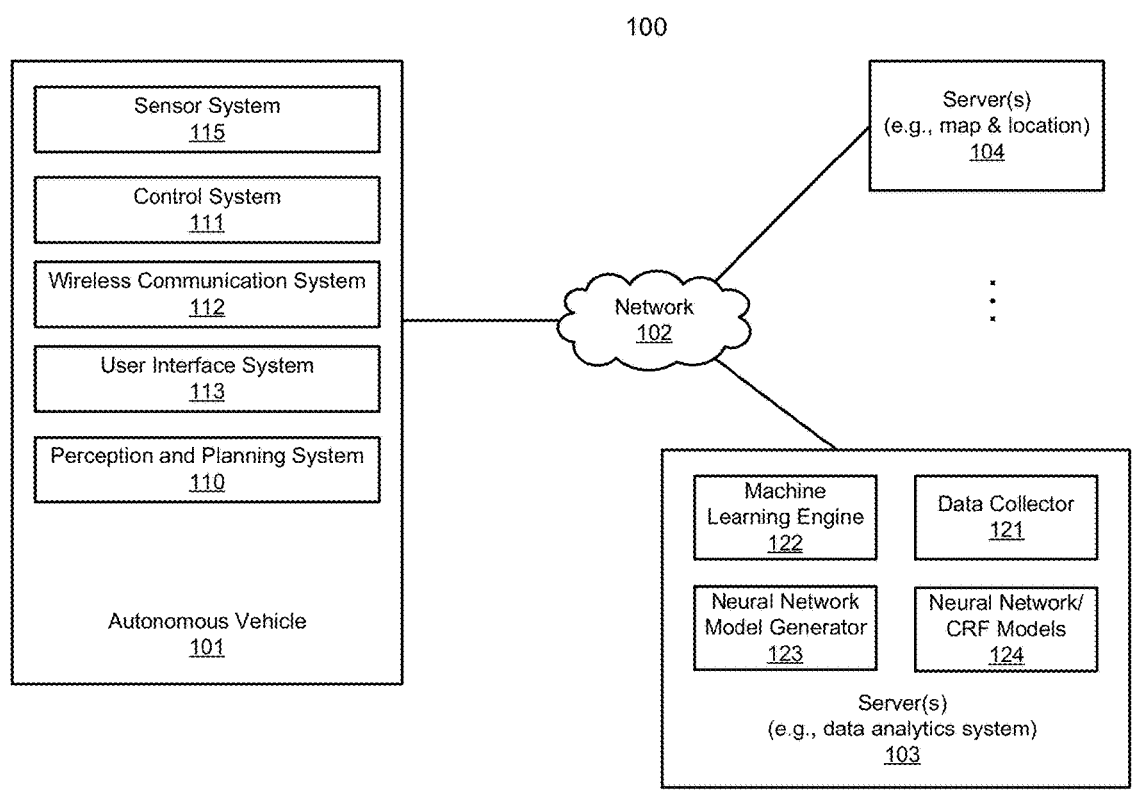
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method or system generates a high resolution 3-D point cloud to operate an autonomous driving vehicle (ADV) from a low resolution 3-D point cloud and camera-captured image(s). Machine learning (deep learning) techniques are used to combine a low resolution LIDAR unit with a calibrated multi-camera system to realize a functional equivalent of a high resolution LIDAR unit to generate 3-D point clouds. The multi-camera system is designed to output a wide-angle (e.g., 360 degree) mono or stereo color (e.g., red, green, and blue, or RGB) panorama images. Then an end-to-end deep neural network is trained with reliable data and applied to realize a wide-angle panorama depth map from the input signals consisting of the wide-angle mono or stereo panorama image(s) and a depth grid of the 3-D point cloud from a low cost LIDAR projected onto the mono or stereo panorama image(s), based on offline calibration parameters. Finally, a high resolution 3-D point cloud can be generated from the wide-angle panorama depth map. The same process applies to a configuration with a narrower view angle (e.g., a limited range of degrees of angles) stereo cameras and narrower view angle low resolution LIDAR.

According to one aspect, the system receives a first image captured by a first camera, the first image capturing a portion of a driving environment of the ADV. The system receives a second image representing a first depth map of a first point cloud corresponding to the portion of the driving environment produced by a light detection and ranging (LiDAR) device. The system downsamples the second image by a predetermined scale factor until a resolution of the second image reaches a predetermined threshold. The system generates a second depth map by applying a convolutional neural network (CNN) model to the first image and the downsampled second image, the second depth map having a higher resolution than the first depth map such that the second depth map represents a second point cloud perceiving the driving environment surrounding the ADV.

According to another aspect, the system receives a first image captured by a first camera, the first image capturing a portion of a driving environment of the ADV. The system receives e a second image representing a first depth map of a first point cloud corresponding to the portion of the driving environment produced by a light detection and ranging (LiDAR) device. The system upsamples the second image by a predetermined scale factor to match an image scale of the first image. The system generates a second depth map by applying a convolutional neural network (CNN) model to the first image and the upsampled second image, the second depth map having a higher resolution than the first depth map, such that the second depth map represents a second point cloud utilized to perceive the driving environment surround the ADV.

According to another aspect, the system receives a first image captured by a first camera, the first image capturing a portion of a driving environment of the ADV. The system receives a second image representing a first depth map of a first point cloud corresponding to the portion of the driving environment produced by a light detection and ranging (LiDAR) device. The system determines a second depth map by applying a convolutional neural network (CNN) model to the first image. The system generates a third depth map by applying a conditional random field function to the first image, the second image, and the second depth map, the third depth map having a higher resolution than the first depth map, such that the third depth map represents a second point cloud perceiving the driving environment surrounding the ADV.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
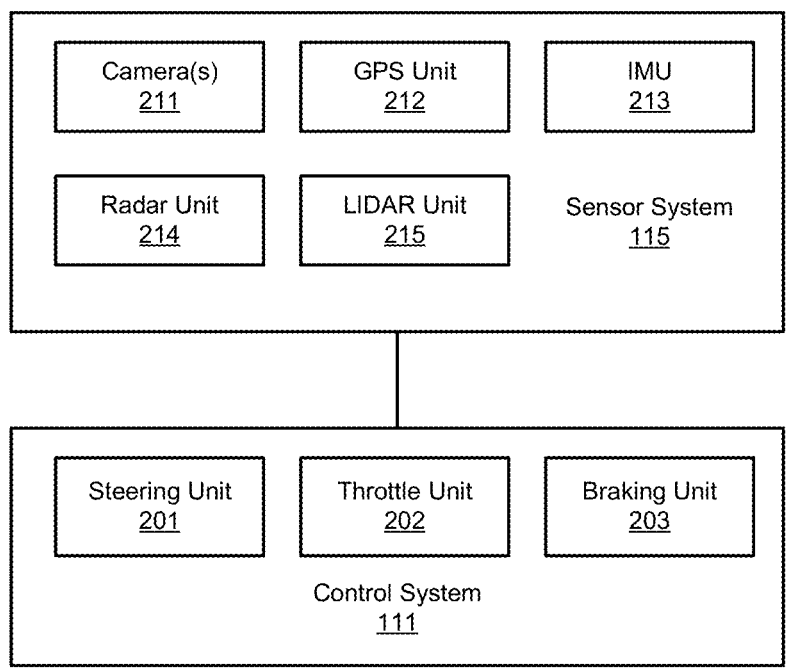
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121, machine learning engine 122, neural network model generator 123, and neural network/CRF models 124. Data collector 121 may collect various training data from a variety of vehicles equipped with LiDAR sensors/cameras communicatively coupled to server 103, either autonomous vehicles or regular vehicles driven by human drivers. Examples of training data may be depth/image data for image recognition functions, such as object segmentation, detection, tracking, and classification. Training data may be compiled into categories and associated with ground true labels. In another embodiment, data collector 121 may download a training data set from an online archive from the world wide web.

Based on the training data collected by data collector, machine learning engine 122 may generate or train a set of neural network/CRF models 124 for a variety of purposes. For example, machine learning engine 122 can perform end-to-end training for CNN models, as part of neural network/CRF models 124, with training data, such as RGB image(s)/3-D low resolution point cloud and 3-D high resolution point cloud input/output pairs.

CNN is a type of feed-forward artificial neural network (ANN) in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. A deep CNN is a CNN with multiple inner layers. "Inner layers" of a neural network refers to layers in between the input and the output layers of the neural network.

ANN is a computational approach based on a large collection of neural units or neurons, loosely modeling the biological brain with a large collection of neurons connected by axons. Each neuron is connected with many other neurons and the axons or connections can be reinforced or inhibited in their effect on the activation state of connected neurons with learning or training. Each individual neuron may have a function which combines the values of all its inputs together. There may be a threshold function or limiting function on each connection and on the unit itself: such that the signal must surpass the limit before propagating to other neurons. These systems are self-learning and trained, rather than explicitly programmed.

"Training" a CNN involves iteratively applying inputs to an input layer of the CNN and comparing desired outputs with actual outputs at the output layer of the CNN to calculate error terms. These error terms are used to adjust weights and biases in the hidden layers of the CNN so that the next time around the output values will be closer to the "correct" values. The distribution of inputs of each layers slows down the training, i.e., a lower training rate is required for convergence, and requires a careful parameter initialization, i.e., setting initial weights and biases of activations of the inner layers to specific ranges for convergence. "Convergence" refers to when the error terms reach a minimal value.

Once a CNN model is trained, the model can be uploaded to ADVs, such as ADV 101 to generate real-time high resolution 3-D point clouds. The high resolution 3-D point clouds can be generated in real-time by inferring depth maps from camera-captured optical images and low resolution 3-D point clouds captured by low cost RADAR and/or LIDAR units. Note that neural network/CRF models 124 is not limited to convolutional neural network and conditional random field (CRF) models but may include radial basis function network models, recurrent neural network models, Kohonen self-organizing network models, etc. Neural network/CRF models 124 may include various deep CNN models such as LeNet™, AlexNet™ ZFNet™, GoogLeNet™, VGGNet™, or a combination thereof. Furthermore, normalization layers may be introduced at activation layers to reduce the training time and increase the convergence rate. Additionally, dropout layers may be introduced at random nodes to remove the node's contribution to the activation layers to prevent overfitting of training data.

Figure 3:
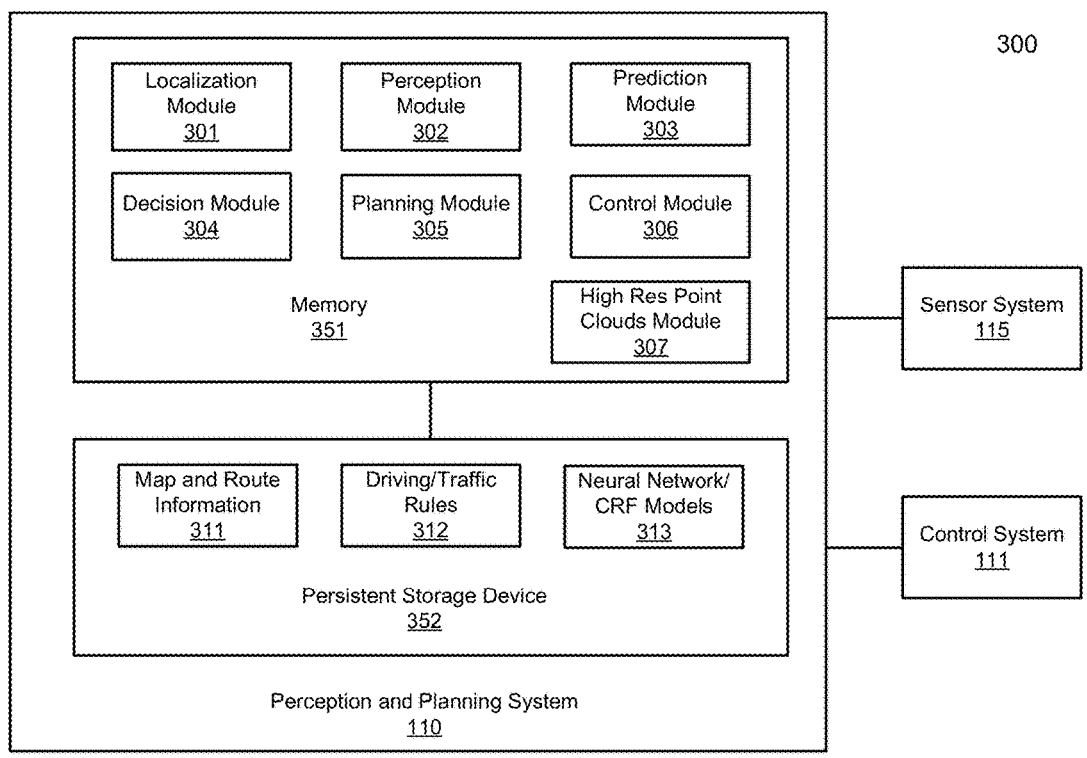
FIG. 3 is a block diagram illustrating an example of a perception and planning system used with an autonomous vehicle according to one embodiment.

FIG. 3 is a block diagram illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, and high resolution point clouds module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

High resolution point clouds module 307 generates high resolution 3-D point clouds based on camera-captured images and low resolution 3-D point clouds captured by radar and/or LIDAR units. The high resolution 3-D point clouds may be utilized by perception module 302 to perceive a driving environment of the ADV. Such images/3-D point clouds may be gathered by sensor system 115. Point clouds module 307 can apply one or more CNN models (as part of neural network/CRF models 313) to the camera-captured images and low resolution LIDAR data to generate higher resolution LIDAR point clouds. Note, point clouds module 307 and perception module 302 may be integrated as an integrated module.

Figure 4:
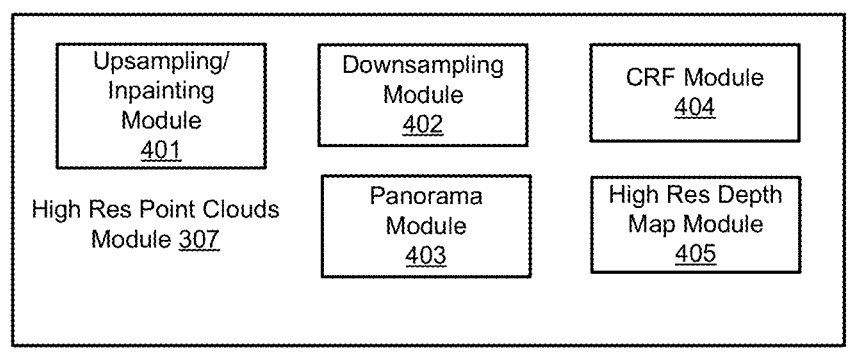
FIG. 4 is a block diagram illustrating an example of a high resolution point clouds module used with an autonomous vehicle according to one embodiment.

FIG. 4 is a block diagram illustrating an example of a high resolution point clouds generator used with an autonomous vehicle according to one embodiment. High resolution point clouds module 307 includes upsampling and/or inpainting module 401, downsampling module 402, panorama module 403, conditional random field (CRF) module 404, and high resolution depth map module 405. Upsampling and/or inpainting module 401 can upsample an input image, i.e., increase an image size by a factor. The inpainting module can apply an inpainting algorithm to restore or reconstruct lost or deteriorated parts of an image, such a dark spot introduced by black objects in a depth map. Downsampling module 402 can downsample an image, i.e., decrease an image size by a factor. Panorama module 403 can convert narrower angle image(s) into wider angle view (e.g., 360 degree view) panorama images, or vice versa. For example, Panorama module 403 can first map overlapping field of view perspective images into either cylindrical or spherical coordinates. The mapped images are then blended and/or stitched together. Here, stitched image shows a wider degree horizontal field of view and a limited vertical field of view for cylindrical coordinates or a 180 degree vertical field of view for spherical coordinates. Panoramas in this projection are meant to be viewed as though the image is wrapped into a cylinder/sphere and viewed from within. When viewed on a 2D plane, horizontal lines appear curved while vertical lines remain vertical. CRF module 404 can apply a CRF (e.g., an optimization model) model to output of a CNN model and a low resolution depth map to further refine depth map estimations. Lastly, high resolution depth map module 405 applies a CNN model to RGB image(s)/LIDAR depth image inputs to generate a high resolution LIDAR depth image.

Some or all of modules 401-405 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 401-405 may be integrated together as an integrated module. For example, upsampling module 401 and downsampling module 402 may be integrated with high resolution depth map module 405.

Figure 5A:
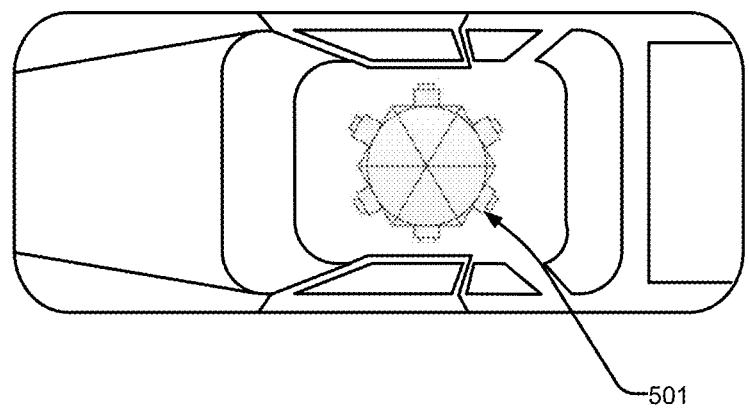
FIG. 5A is a diagram illustrating an example ADV according to one embodiment.

FIG. 5A is a diagram illustrating an example ADV according to one embodiment. Referring to FIG. 5A, ADV 101 includes a roof-mounted LIDAR/panorama camera configuration 501. In another embodiment, LIDAR/panorama camera configuration 501 may be mounted on a hood or trunk of ADV 101, or anywhere on an ADV suitable for placements of such sensor units.

Figures 5B, 5C:
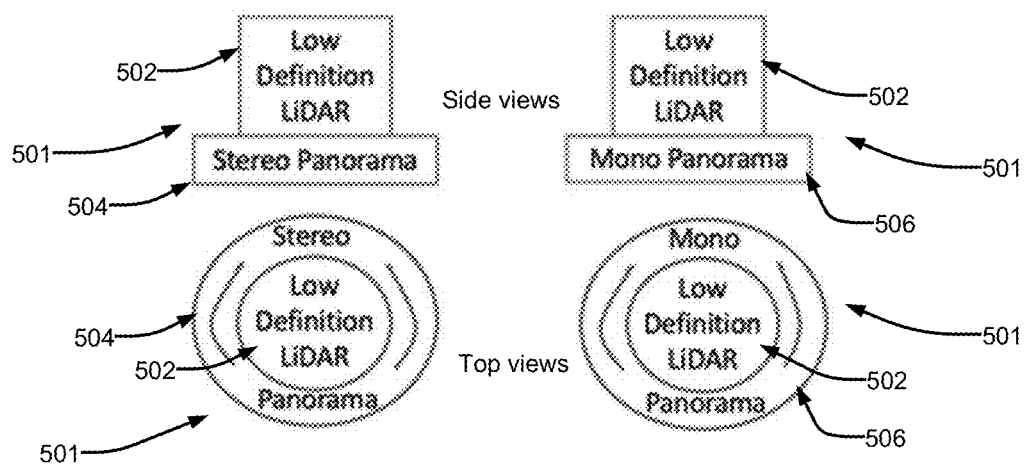
FIGS. 5B and 5C illustrate top and side views of LIDAR/panorama camera configurations used with autonomous vehicles according to some embodiments.

FIGS. 5B and 5C illustrate top and side views of LIDAR/panorama camera configurations according to some embodiments. Referring to FIG. 5B, in one embodiment, configuration 501 includes low definition or low resolution LIDAR unit 502 and stereo panorama cameras 504 (e.g., multiple cameras). In one embodiment, LIDAR unit 502 can be placed on top of camera units 504. The units can be calibrated to have a similar reference point, such as a central vertical reference line (not shown) for the LIDAR and panorama cameras to rotate about the reference line. Referring to FIG. 5C, in one embodiment, configuration 501 includes low resolution LIDAR unit 502 with mono panorama cameras 506. Similarly, LIDAR unit 502 can be placed on top of camera units 506 and these units can be calibrated to have a similar reference point, such as a central vertical reference line (not shown) for the LIDAR and panorama cameras to rotate about the reference line. Note, low resolution or low definition LIDAR units refers to LIDAR units that captures sparse 3-D point clouds or point clouds with fewer points in comparison with a high resolution LIDAR unit. Sparse 3-D point clouds contain less depth data or information in comparison with dense 3-D point clouds. For an example comparison, a LIDAR unit having 16 or fewer channels capturing a wider degrees view at 300,000 points per second may be a low resolution unit in comparison with a LIDAR unit having higher number of channels (e.g., 64 channels) capturing a wider angle view at two million points per second.

FIG. 5D illustrates a top and a side view of a mono panorama camera configuration according to one embodiment. In one embodiment, mono panorama camera configuration 506 includes six cameras placed in the shape of a hexagon. The center of the hexagon can be a central reference point for determining focal point, field of view, and angle of view for the cameras. Each camera and its neighboring cameras can be positioned about 60 degrees apart in horizontal angle of view for a complete wider horizontal angle of view (e.g., 360 degree view). In one embodiment, each of the six cameras can capture images with a horizontal angle of view angle that is about 120 degrees so that there is about 30 degrees overlap between images captured by both the left and the right neighboring cameras. The overlaps can be used for blending and/or stitching the captured images together to generate a panoramic image.

Having generated cylindrical or spherical panorama images (e.g., panorama RGB images), 3-D point clouds can be projected onto (2-D) cylindrical or spherical image planes to be aligned to the cylindrical or spherical panorama RGB images. For example, a 3-D point can be projected onto a 2-D cylindrical (or warped) image plane illustrated as follows. Let (u, v) be a pixel's location on a warped image plane. The pixel's location on a 2-D cylindrical surface would then be (r, h), where $$r = f tan^{-1}\left(\frac{u}{f}\right) \quad \text{or} \quad u = ftan\left(\frac{r}{f}\right)$$
$$h = fv/\sqrt{u^2 + f^2} \quad v = h/\cos\left(\frac{r}{f}\right)$$

and f is the camera focal length. The same 3-D point can be projected onto a 2-D spherical image plane illustrated as follows.

Let (u, v) be a pixel's location on warped image plane. The pixel's location on a 2-D spherical surface would then be (r, h), where $$r = ftan^{-1}\left(\frac{u}{f}\right) \quad \text{or} \quad u = ftan\left(\frac{r}{f}\right)$$
$$h = ftan^{-1}\left(\frac{v}{\sqrt{u^2+f^2}}\right) \quad v = ftan\left(\frac{h}{f}\right)/\cos\left(\frac{r}{f}\right)$$

and f is the camera focal length. To reconstruct point clouds from depth maps, the reverse conversion can be performed by unprojecting a 2-D panorama depth map onto a 3-D space. Triangulation can be performed based on pixels of the panorama surface. In one embodiment, triangulation can be performed directly from locations of those pixels on a camera image plane. In some embodiments, more cameras such as three to eight cameras may be used for panorama camera configuration 506. The cameras may be arranged in shapes of triangle, rectangle, pentagon, or octagon, respectively.

FIGS. 5E and 5F illustrating examples of stereo panorama camera configurations according to some embodiments. Referring to FIG. 5E, in one embodiment, stereo panorama camera configuration 514 (e.g., camera configuration 504 of FIG. 5B) includes twelve cameras placed in a hexagonal shape. The center of the hexagonal shape can be a central reference point for determining view angles for the cameras and as a baseline for pairs of stereo cameras to build stereo panorama images. Each stereo pair (a left and a right) of cameras and its neighboring stereo cameras can be positioned about 60 angular degrees apart.

Figure 6C:
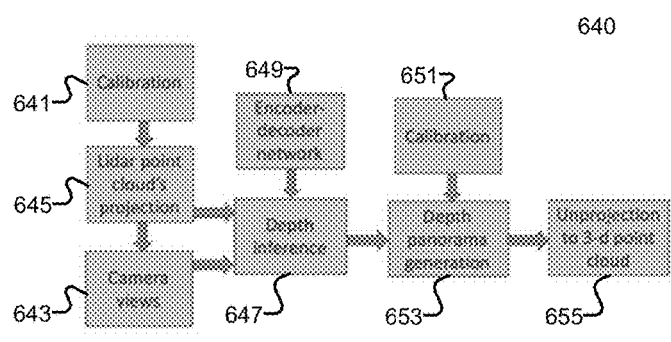
FIGS. 6C and 6D illustrate flowcharts of an inference mode and a training mode respectively according to one embodiment.

Referring to FIG. 6C, in one embodiment, stereo panorama camera configuration 524 (e.g., camera configuration 504 of FIG. 5B) includes two mono panorama camera configurations, each having six cameras placed in a hexagonal shape. Here, instead of a left and a right stereo pair, the stereo panorama camera configuration has vertical top and bottom stereo pairs. Captured stereo panoramic images may be projected onto a cylindrical surface or a spherical surface as illustrated above. Images captured by stereo pairs of cameras are subsequently used as inputs (along with low resolution LIDAR images) to a high resolution depth map module, such as high resolution depth map module 405 of FIG. 4 to generate high resolution depth maps or LIDAR images.

Figure 6D:
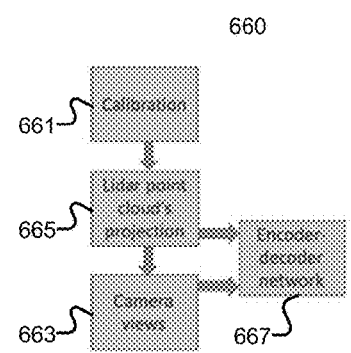

FIGS. 6A and 6B illustrate flowcharts of an inference mode and a training mode respectively according to one embodiment. FIGS. 6C and 6D illustrate flowcharts of an inference mode and a training mode respectively according to one embodiment. FIGS. 6A and 6B refer to building mono or stereo panorama image(s) from camera images (by image blending and/or stitching techniques) and then fusing the panorama image(s) with LIDAR image to generate a high resolution panorama depth/disparity map. FIGS. 6C and 6D refer to fusing the camera images with LIDAR image to generate high resolution depth/disparity maps and then blend and/or stitch together the depth maps to generate a panorama depth map.

Referring to FIG. 6A, an inference mode is described according to one embodiment. Process 600 may be performed by processing logic which may include software, hardware, or a combination thereof. For example, process 600 may be performed by a point clouds module of an autonomous vehicle, such as point clouds module 307 of FIG. 3. Referring to FIG. 6A, at block 601, processing logic calibrates or configures the camera devices (e.g., determining a reference center for a panorama configuration, determining and/or adjusting a focal length of the cameras). At block 603, processing logic generates wider angle (e.g., 360 degree) stereo or mono, cylindrical or spherical, panorama image(s). At block 605, processing logic projects LIDAR 3D point clouds onto the panorama image(s) to generate a depth grid or depth map. At block 607, based on the depth grid and a mono/stereo panorama image, processing logic performs inference with encoder-decoder network 611 (e.g., a trained CNN/CNN+CRF model) to generate the panoramic depth map. At block 609, processing logic unprojects the panoramic depth map back to 3-D space to generate a high resolution point cloud.

Referring to FIG. 6B, a training mode is described by processor 620 according to one embodiment. Process 620 may be performed by processing logic which may include software, hardware, or a combination thereof. For example, process 620 may be performed by a machine learning engine, such as machine learning engine 122 of server 103 of FIG. 1. For the training mode, training data is collected such as high resolution LIDAR point clouds and mono/stereo RGB image(s). At block 621, depending on the data image source, processing logic calibrates or at least determines camera focal length for the camera images. At block 623, processing logic generates panorama images based on the mono/stereo image(s). At block 625, processing logic projects the LIDAR point clouds onto an image plane and/or upsamples the LIDAR image to the RGB image scale. For mono panorama, encoder-decoder network 627 learns to infer a high resolution depth panorama from a low resolution depth panorama. For stereo panorama, encoder-decoder network 627 learns to improve stereo panorama matching with a low resolution depth panorama projected from a low resolution LIDAR 3-D point cloud.

Referring to FIG. 6C, an inference mode is described according to one embodiment. Process 640 may be performed by processing logic which may include software, hardware, or a combination thereof. For example, process 640 may be performed by a point clouds module of an autonomous vehicle, such as point clouds module 307 of FIG. 3. Referring to FIG. 6C, at block 641, processing logic calibrates or configures the camera devices (e.g., determining a reference center for a panorama configuration, determining and/or adjusting a focal length of the cameras). At block 643, processing logic preprocesses the camera views, such as warping the camera views to a perspective view or a non-panorama cylindrical/spherical view. At block 645, processing logic projects low resolution LIDAR 3D point clouds onto the camera image(s) to generate low resolution depth grid or depth maps. At block 647, based on the depth grids and a mono/stereo panorama image, processing logic performs inference with encoder 649 (e.g., a trained CNN/CNN+CRF model) to generate the high resolution depth maps. At block 653, processing logic generates wider angle panorama depth map based on calibration information 651 (such as calibration information 641). At block 655, processing logic unprojects the panoramic depth map back to 3-D space to generate a high resolution point cloud.

Referring to FIG. 6D, a training mode is described by processor 660 according to one embodiment. Process 660 may be performed by processing logic which may include software, hardware, or a combination thereof. For example, process 660 may be performed by a machine learning engine, such as machine learning engine 122 of server 103 of FIG. 1. For the training mode, a well-known set of training data is collected such as high resolution LIDAR point clouds and mono/stereo RGB image(s). At block 661, depending on the data image source, processing logic calibrates or at least determines camera focal length for the camera images. At block 663, processing logic prepares camera images for training based on the mono/stereo image(s). At block 665, processing logic projects the LIDAR point clouds onto an image plane of the RGB images and/or upsamples the LIDAR image to the RGB image scale. For mono camera images, encoder-decoder network 667 learns to infer a high resolution depth panorama from a low resolution depth panorama. For stereo camera images, encoder-decoder network 667 learns to improve stereo panorama matching with a low resolution depth panorama projected from a low resolution LIDAR 3-D point cloud.

The output of the encoder/decoder network 627 (e.g., a CNN model) is compared with an expected result to determine whether the difference between the output of encoder/decoder network 627 and the expected result is below a predetermined threshold. If the difference is above the predetermined threshold, the above process may be iteratively performed by modifying certain parameters or coefficients of the model. The repeated process may be performed until the difference drops below the predetermined threshold, at which point, the final product of the model is considered completed. The model is then utilized in real-time in an ADV to generate high resolution point clouds based on low resolution point clouds and images captured by one or more cameras.

Figure 7A:
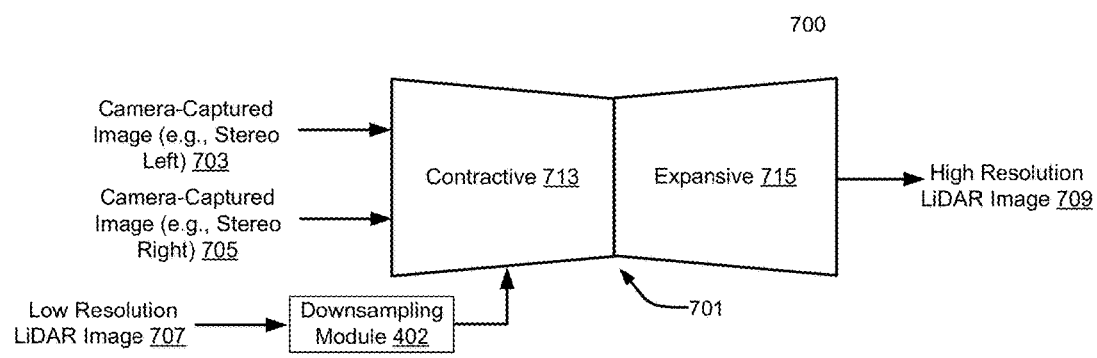
FIGS. 7A and 7B are block diagrams illustrating examples of depth map generations according to some embodiments.
Figure 7B:
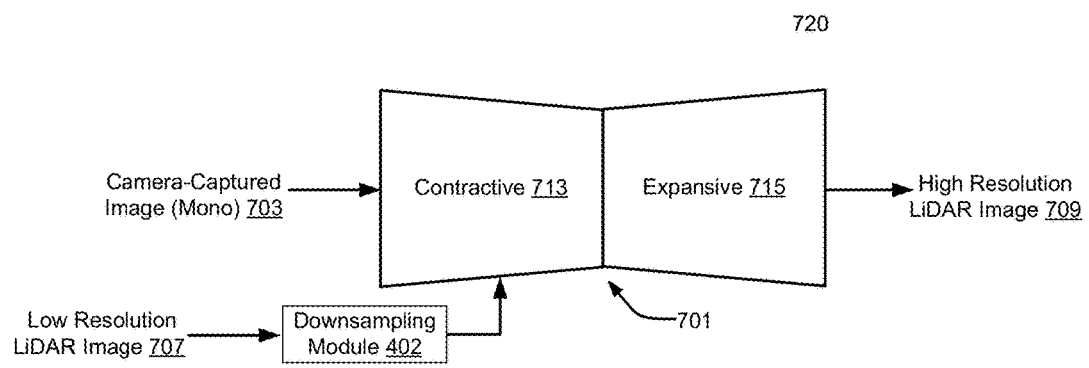

FIGS. 7A and 7B are block diagrams illustrating examples of depth map generations according to some embodiments. Referring to FIG. 7A, in one embodiment, depth map generator 700 can include downsampling module 402 and CNN model 701. CNN model 701 (as part of neural network/CRF models 313) can include contractive (or encoder or convolutional layers) 713 and expansive (or decoder or deconvolutional layers) 715. FIG. 7B illustrates another exemplary embodiment depth map generator 720. Depth map generators 700 and 720 may be performed by depth map module 405 of FIG. 4.

Referring to FIGS. 4 and 7B, generator 720 receives a first image (e.g., camera-captured image 703) captured by a first camera(s), the first image capturing a portion of a driving environment of the ADV. The first image can be a RGB image captured by a camera device. Generator 720 receives a second image, e.g., low resolution LIDAR image 707, representing a first depth map of a first point cloud corresponding to the portion of the driving environment produced by a light detection and ranging (LIDAR) device(s). Downsampling module 402 downsamples the second image (e.g., image 707) by a predetermined scale factor until a resolution of the second image reaches a predetermined threshold. In one embodiment, the second image is downsampled until it is dense, i.e., until an amount of overlap or "gaps" in any of two neighboring cloud points of the second image drops below a predetermined threshold. Generator 720 generates a second depth map (e.g., high resolution depth map 709) by applying CNN model 701 to the first image (e.g., image 703) and the downsampled second image, the second depth map (e.g., image 709) having a higher resolution than the first depth map (e.g., image 707), such that the second depth map (e.g., image 709) represents a second point cloud perceiving the driving environment surrounding the ADV. Note the term "images" generally refers to RGB images or LIDAR images. The terms "depth maps" or "LIDAR images" refers to 2-D images of a 3-D point cloud mapped onto a perspective image plane, or a panorama image plane. "Camera-captured images" refers to optical images captured by a pin-hole camera device.

In one embodiment, camera-captured image 703 and LIDAR image 707 are non-panorama images warped or projected onto a cylindrical or spherical image plane. In another embodiment, camera-captured image 703 and LIDAR image 707 are panorama images, such as a cylindrical or a spherical panorama image. In another embodiment, camera-captured image 703 and LIDAR image 707 are perspective images. Here, for the camera configuration, perspective images may be generated from a single camera set or any single cameras from a mono/stereo panorama camera configuration. For mono panorama camera configurations, the configuration may include multiple cameras capturing multiple images at about the same time, such as configuration 506 of FIG. 5C. The images would be warped and blended and/or stitched together by a panorama module, such as panorama module 403 of FIG. 4, to generate the cylindrical or spherical panorama image.

For the LIDAR configuration, LIDAR image 707 is generated by mapping 3-D point clouds captured by a LIDAR detector from a 3-D space/plane to a 2-D image plane. Here, the 2-D image plane of image 707 can be the same image plane as image 703. In another embodiment, LIDAR image 707 may be a perspective LIDAR image that corresponds to camera-captured perspective image 703. Here, CNN model 701 can be sequentially applied to several perspective pairs of image 703 and image 707 to generate perspective LIDAR images. The generated perspective LIDAR images can then be stitched or blended together by a panorama module such as panorama module 403 of FIG. 4 to generate a panorama LIDAR image. In another embodiment, generator 720 can include multiples of CNN models and these models can be applied concurrently to multiples of perspective pairs of images 703 and images 707 to generate multiples of perspective LIDAR images for panorama image generation.

Referring to FIGS. 4 and 7A, in another embodiment, generator 700 receives a third image, e.g., camera-captured image 705, captured by a second camera(s). A high resolution depth map module of generator 700, such as high resolution depth map module 405 of FIG. 4, generates the second depth map by applying the CNN model to the first image, the upsampled second image, and the third image. Here, images 703-705 can be a left and a right stereo images (e.g., images captured by configuration 514 of FIG. 5E) or a vertical top and bottom stereo images (e.g., images captured by configuration 524 of FIG. 5F). Although only two camera-captured images are shown, more images captured by more cameras can also be utilized as inputs to the CNN model.

Figure 8:
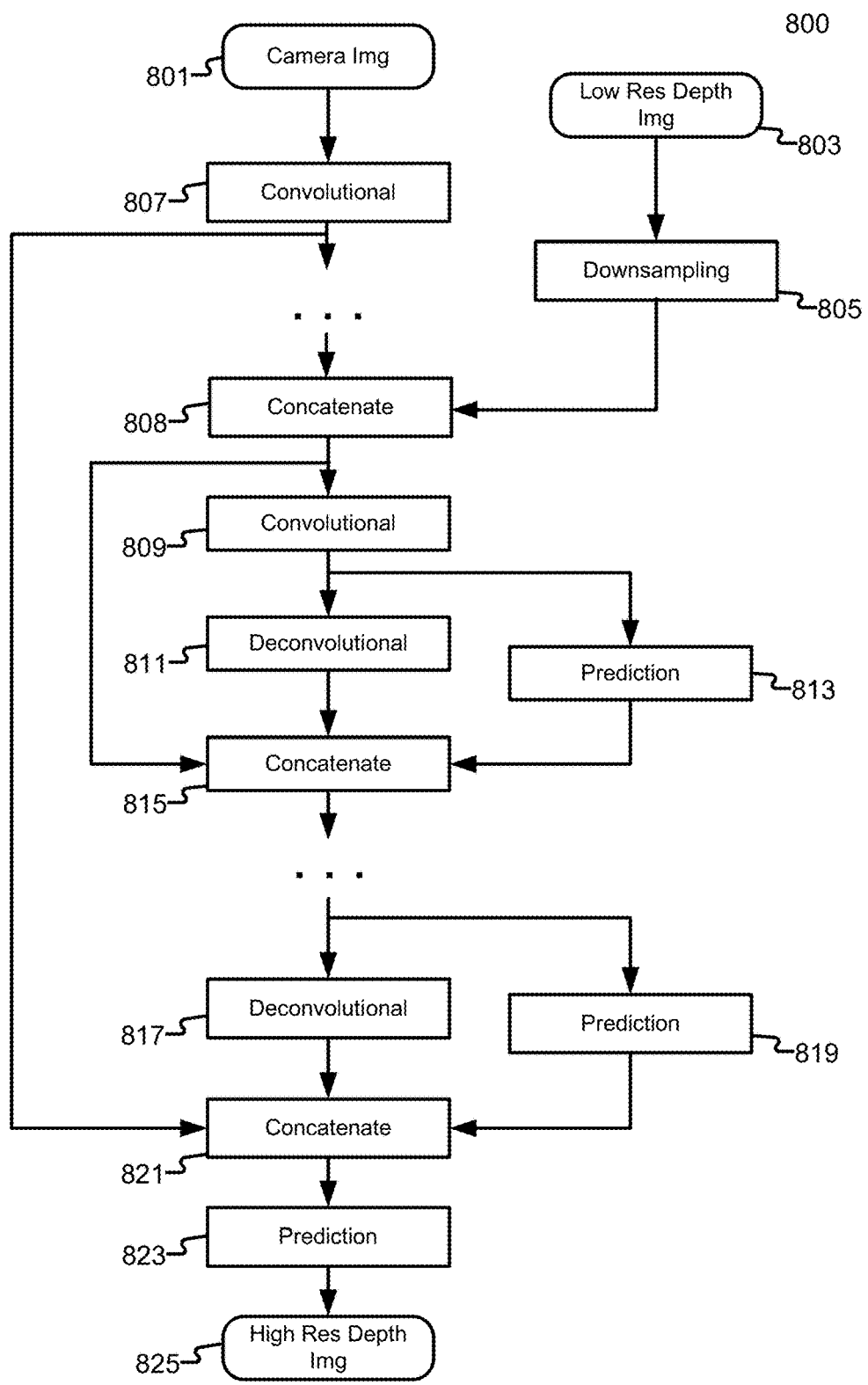
FIG. 8 is a diagram illustrating contracting and expanding layers of a convolutional neural network model according to one embodiment.

FIG. 8 is a diagram illustrating contracting (e.g., encoder/convolutional) and expanding (e.g., decoder/deconvolutional) layers of a CNN model according to one embodiment. CNN model 800 receives camera image 801, low resolution depth image 803, and outputs high resolution depth image 825. For the purpose of illustration, a single RGB image 801 is utilized here. However, multiple images captured from multiple cameras can also be applied, for example, in a stereo configuration. Note that an RGB image refers to a color image throughout this application. Referring to FIG. 8, camera image 801 and low resolution depth image 803 can represent image 703 and image 707 of FIG. 7B respectively. High resolution image 825 can represent image 709 of FIG. 7B. CNN model 800 can include various layers, such as, downsampling layer 805, convolutional layers (807, 809), deconvolutional layers (811, 817), prediction layers (813, 819, 823), and concatenate layers (815, 821).

The convolutional layers (as part of contractive layers 713 of FIG. 7) and deconvolutional layers (as part of expansive layers 715 of FIG. 7) can be connected in a single pipeline. Each of the convolutional or contractive layers can downsample a previous input layer and each of the expansive or deconvolutional layers can upsample a previous input layer. The last layer of contractive layers 713, e.g., layer 809, is connected to a first layer of expansive layers 715, e.g., layer 811 to form the single pipeline. Prediction layers (813, 819, 823) perform a single-channel depth map prediction and feeds forward the prediction to a next layer.

A prediction layer helps to minimize estimation error of the final CNN output by reducing error propagated in the training process. Prediction layers can be implemented like a convolutional layer with the characteristic that the output image has one output channel with the same image size as the input image. Prediction layers however can include an upsampling function to upsample output image size to match an image size of the next layer. Concatenate layers (808, 815, 821) performs a combination function combining one or more images, such as output images of deconvolutional layers, convolutional layers, and/or a prediction layers. Convolutional/deconvolutional layers enables CNN to perform image classification by looking for low level features such as edges and curves, building up to higher level features. Downsampling refers to dividing an image's height and/or width by a factor, such as a factor of two (i.e., the image size is reduced by a factor of four). Upsampling refers to multiplying an image's height and/or width by a factor, such as a factor of two (i.e., the image size is reduced by a factor of four).

Referring to FIG. 8, for the purpose of illustration, in one embodiment, image 801 can include a mono RGB camera image (e.g., a combined 3 channels, 192 pixels by 96 pixels image) or multiple RGB images in a stereo configuration. Low resolution depth image 803 can include a single channel (i.e., grey scale) 48 pixels by 24 pixels LIDAR image (i.e., image 803 is one fourth the scale of image 801). Convolutional layer 807 can receive image 801 and downsamples image 801 by a factor of two to output a 64 channels, 96 pixels by 48 pixels image. Subsequent convolution layers can downsample images from a corresponding input by a factor, such as a factor of two.

Input LIDAR image 803 can be downsampled by downsampling 805 until it is dense. For example, an image is dense if there are no or fewer gaps in the pixels and outputs, e.g., a 512 channels, 24 pixels by 12 pixels image. Concatenate layer 808 can perform a combination for a corresponding output of a convolutional layer (e.g., a 512 channels, 24 pixels by 12 pixels image) and an output of downsampling layer 805 (e.g., a 512 channels, 24 pixels by 12 pixels image) to produce a combined image with higher resolution (e.g, a 1024 channels, 24 pixels by 12 pixels image). Note that in order to combine a downsampled camera image with downsampled depth image or depth map, the size or dimension of two images have to match. Dependent upon the size or dimension of the depth image that has been downsampled, a corresponding convolutional layer matching the size of depth image is utilized to combine the two. Convolution layer 809, for example, can have a 1024 channels, 24 pixels by 12 pixels image as an input and a 2048 channels, 12 pixels by 6 pixels image as an output.

Deconvolutional layer 811 can have a 2048 channels, 12 pixels by 6 pixels image as an input and a 1024 channels, 24 pixels by 12 pixels image as an output. Prediction layer 813 may upsample the input by a factor of two and can have a 2048 channels, 12 pixels by 6 pixels image as an input and a 1 channel, 24 pixels by 12 pixels image as an output. Concatenate layer 815 can have three inputs with matching image sizes, such as: input from convolutional layer 809 (e.g., a 1024 channels, 24 pixels by 12 pixels image), output from prediction 813 (e.g., a 1 channel, 24 pixels by 12 pixels image), and output from deconvolutional layer 811 (e.g., a 1024 channels, 24 pixels by 12 pixels image). Concatenate layer 815 can then output a 2049 channels, 24 pixels by 12 pixels image.

Deconvolutional layer 817 can have a 1024 channels, 48 pixels by 24 pixels image as an input and a 512 channels, 96 pixels by 48 pixels image as an output. Prediction layer 819 may upsample a previous input by a factor of two and can have a 1024 channels, 48 pixels by 24 pixels image as an input and a 1 channel, 96 pixels by 48 pixels image as an output. Concatenate 821 can have three inputs: a feedforward from a convolutional layer (e.g., a 64 channels, 96 pixels by 48 pixels image), output from prediction layer 819 (e.g., a 1 channel, 96 pixels by 48 pixels image), and output from deconvolutional layer 817 (e.g., a 512 channels, 96 pixels by 48 pixels image). Concatenate 821 would then combine these inputs and output a 577 channels, 96 pixels by 48 pixels image. Prediction layer 823 may upsample the input by a factor of two and can have a 577 channels, 96 pixels by 48 pixels image as an input and output an one channel, 96 pixels by 48 pixels depth image as output 825. Note, in some embodiments, convolutional layers may be configured to feed forward at random layers. In some embodiments, pooling layers are inserted between convolutional layers and unpooling layers are inserted between deconvolutional layers. Note, FIG. 8 illustrates one CNN model embodiment and should not be construed to be limiting. For example, in some embodiments, a CNN model may include different activation functions (e.g., ReLU, sigmoid, step, tanh, etc.), dropout layers, and normalization layers, etc.

Figure 9A:
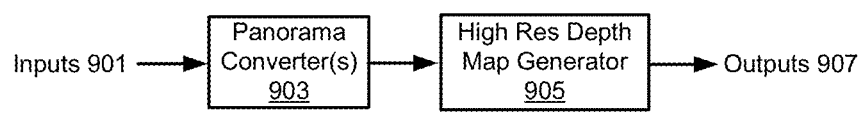
FIGS. 9A and 9B are block diagrams illustrating examples of high resolution depth map generations according to some embodiments.
Figure 9B:
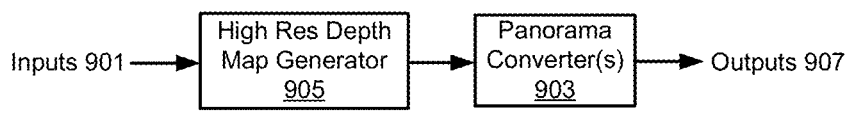

FIGS. 9A and 9B are block diagrams illustrating examples of high resolution depth map generations according to some embodiments. Panorama converter(s) 903 and map generator 905 of FIG. 9A may represent encoder-decoder network 611 and panorama generation 603 of FIG. 6A respectively. Panorama converter(s) 903 and map generator 905 of FIG. 9B collectively may represent encoder-decoder network 649 and panorama generation 653 of FIG. 6C respectively. High resolution depth map generator 905 may be performed by high resolution depth map module 405 and panorama generator 903 may be performed by panorama module 403 of FIG. 4. Referring to FIG. 9A, an input of high resolution depth map generator 905 is coupled to an output of panorama converter(s) 903. Here, inputs 901, such as camera-captured images 703 and 705 of FIG. 7A, and low resolution LIDAR image 707 of FIG. 7A, can be converted into panorama images by panorama converter(s) 903. Generator 905 receives the panorama images and generates outputs 905, e.g., a high resolution depth map such as LIDAR image 709 of FIG. 7A. In this configuration, the input images are combined by blending together to generate a panorama image before feeding it into the CNN model in order to generate a high resolution depth map.

Referring to FIG. 9B, in one embodiment, an output of high resolution depth map generator 905 is coupled to an input of panorama converter(s) 903. Here, inputs 901, such as camera-captured images 703 and 705 of FIG. 7A, and low resolution LIDAR image 707 of FIG. 7A, can be applied by a CNN model (as part of high resolution depth map generator 905) by generator 905. The output depth maps are received by panorama converter(s) 903. Converter(s) 903 converts outputs of generator 905 into panorama depth maps, e.g., outputs 907. In this example, original images captured by the cameras are fed into the CNN model to generate individual high resolution depth maps respectively. The individual depth maps are then combined by blending into a high resolution panorama depth map.

Figure 10:
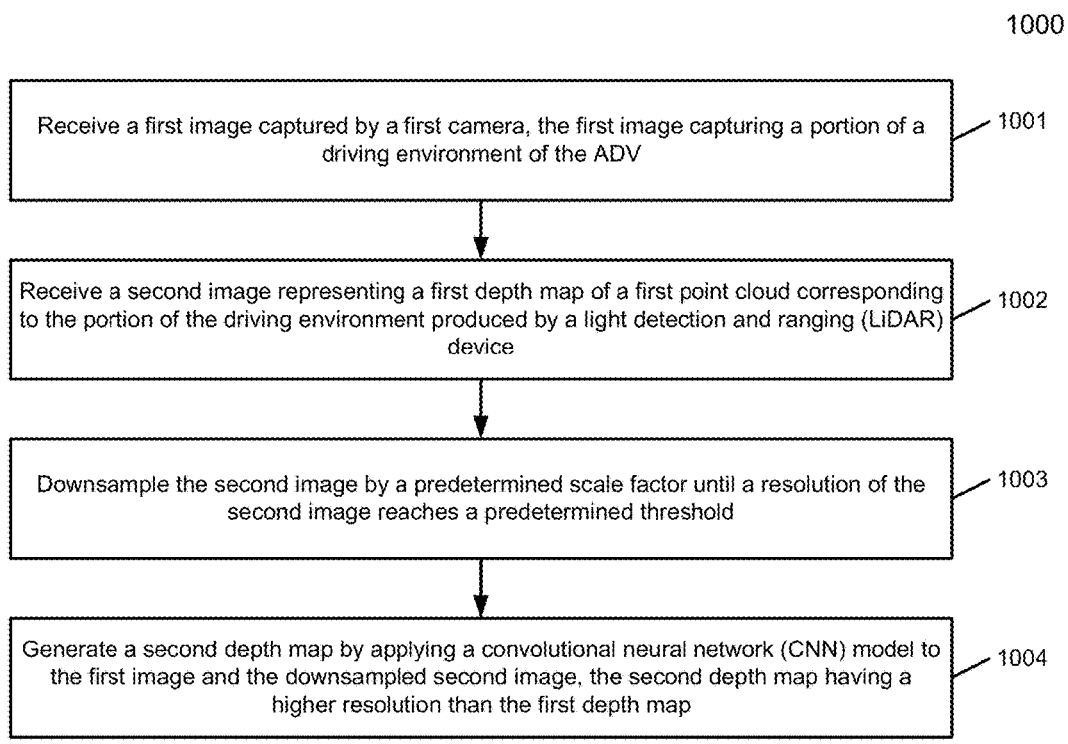
FIG. 10 is a flow diagram illustrating a method according to one embodiment.

FIG. 10 is a flow diagram illustrating a method according to one embodiment. Process 1000 may be performed by processing logic which may include software, hardware, or a combination thereof. For example, process 1000 may be performed by a point clouds module of an autonomous vehicle, such as point clouds module 307 of FIG. 3. Referring to FIG. 10, at block 1001, processing logic receives a first image captured by a first camera, the first image capturing a portion of a driving environment of the ADV. At block 1002, processing logic receives a second image representing a first depth map of a first point cloud corresponding to the portion of the driving environment produced by a LiDAR device. In block 1003, processing logic downsamples the second image by a predetermined scale factor until a resolution of the second image reaches a predetermined threshold. In block 1004, processing logic generates a second depth map by applying a convolutional neural network (CNN) model to the first image and the downsampled second image, the second depth map having a higher resolution than the first depth map such that the second depth map represents a second point cloud perceiving the driving environment surrounding the ADV.

In one embodiment, processing logic receives a third image captured by a second camera and generates the second depth map by applying the CNN model to the first image, the downsampled second image, and the third image. In one embodiment, the first image includes a cylindrical panorama image or a spherical panorama image. In another embodiment, the cylindrical panorama image or the spherical panorama image is generated based on a number of images captured by a number of camera devices. In another embodiment, processing logic reconstructs the second point cloud by projecting the second depth map into a 3-D space based on the cylindrical panorama image or the spherical panorama image.

In one embodiment, processing logic maps the downsampled second image onto an image plane of the first image. In one embodiment, the second depth map is generated by blending one or more generated depth maps such that the second depth map is a panorama map.

In one embodiment, the CNN model includes contractive layers where each contractive layer includes an encoder to downsample a respective input and expansive layers coupled to the contractive layers, where each expansive layer includes a decoder to upsample a respective input. In one embodiment, information of the contractive layers are fed forward to the expansive layers, for example, contractive layer outputs are fed forward to an input of the expansive layers having matching images sizes or dimensions. In one embodiment, each of the expansive layers includes a prediction layer to predict a depth map for a subsequent layer.

Figure 11A:
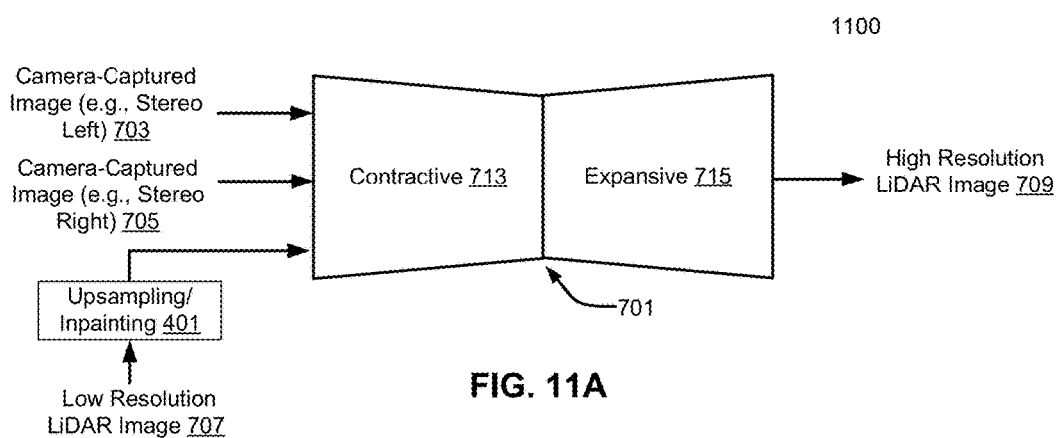
FIGS. 11A and 11B are block diagrams illustrating examples of depth map generations according to some embodiments.
Figure 11B:
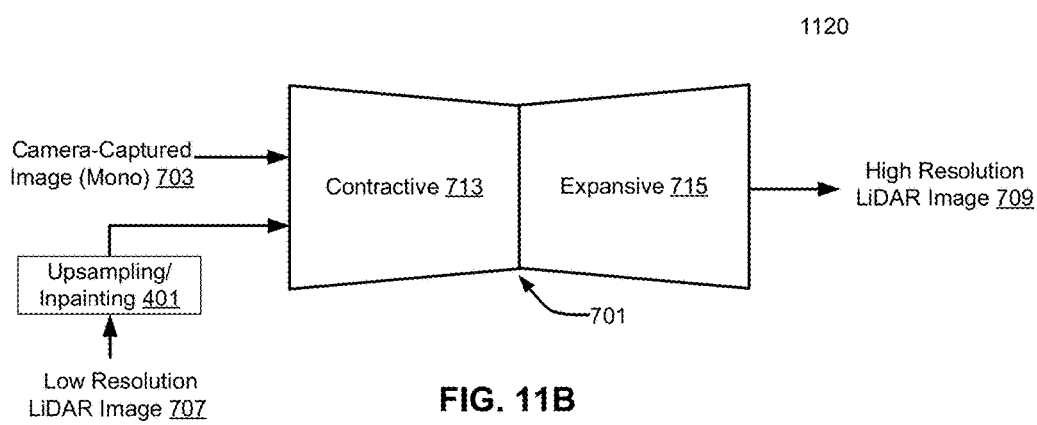

FIGS. 11A and 11B are block diagrams illustrating examples of depth map generations according to some embodiments. Referring to FIG. 11A, in one embodiment, depth map generator 1100 can include upsampling/inpainting module 401 and CNN model 701. CNN model 701 (as part of neural network/CRF models 313) can include contractive (or encoder or convolutional layers) 713 and expansive (or decoder or deconvolutional layers) 715. FIG. 11B illustrates another exemplary embodiment depth map generator 1120. Depth map generators 1100 and 1120 may be performed by depth map module 405 of FIG. 4.

Referring to FIGS. 4 and 11B, generator 1120 receives a first image (e.g., camera-captured image 703) captured by a first camera, the first image capturing a portion of a driving environment of the ADV. Generator 1120 receives a second image, e.g., low resolution LIDAR image 707, representing a first depth map of a first point cloud corresponding to the portion of the driving environment produced by a light detection and ranging (LIDAR) device. Upsampling/inpainting module 401 upsamples the second image (e.g., image 707) by a predetermined scale factor to match image 707 to an image scale of the image 703. In one embodiment, the upsampled second image is applied an inpainting function algorithmically to restore any missing parts of the images, for example, a background portion of upsampled image is inpainted. Inpainting is a process of restoring or reconstructing lost or deteriorated parts of images. In another embodiment, the inpainting algorithm can include a comparison of a LIDAR-captured image to a LIDAR image captured in a previous time frame. Generator 1120 generates a second depth map (e.g., high resolution depth map 709) by applying CNN model 701 to the first image (e.g., image 703) and the upsampled and/or inpainted second image, the second depth map (e.g., image 709) having a higher resolution than the first depth map (e.g., image 707), such that the second depth map (e.g, image 709) represents a second point cloud perceiving the driving environment surrounding the ADV.

In one embodiment, camera-captured image 703 and LIDAR image 707 are panorama images, such as a cylindrical or a spherical panorama image. In another embodiment, camera-captured image 703 and LIDAR image 707 are perspective images. Here, for the camera configuration, perspective images may be generated from a single camera set or a single camera from a mono panorama camera configuration. For mono panorama camera configurations, the configuration may include multiple perspective cameras capturing multiple images at about the same time, such as configuration 506 of FIG. 5C. The images would be blended or stitched together by a panorama module, such as panorama module 403 of FIG. 4, to generate the panorama image.

For the LIDAR configuration, LIDAR image 707 is generated by mapping 3-D point clouds captured by a LIDAR detector from a 3-D space/plane followed by a conversion of the 3-D point clouds to a 2-D image plane. Here, the 2-D image plane of image 707 can be the same image plane as image 703. In another embodiment, LIDAR image 707 may be a perspective LIDAR image that corresponds to perspective camera-captured image 703. Here, CNN model 701 can be sequentially applied to several perspective pairs of image 703 and image 707 to generate perspective LIDAR images. The generated perspective LIDAR images can then be stitched or blended together by a panorama module such as panorama module 403 of FIG. 4 to generate a panorama LIDAR image. In another embodiment, generator 1120 can include multiples of CNN models and these models are applied concurrently to multiples of perspective pairs of image 703 and image 707 to generate multiples of perspective LIDAR images for panorama image generation.

Referring to FIGS. 4 and 11A, in another embodiment, generator 1100 receives a third image, e.g., camera-captured image 705, captured by a second camera(s). Generator 1100 generates the second depth map by applying the CNN model to the first image, the upsampled and/or inpainted second image, and the third image. Here, images 703-705 can be a left and a right stereo images (e.g., images captured by configuration 514 of FIG. 5E) or a vertical top and bottom stereo images (e.g., images captured by configuration 524 of FIG. 5F).

Figure 12:
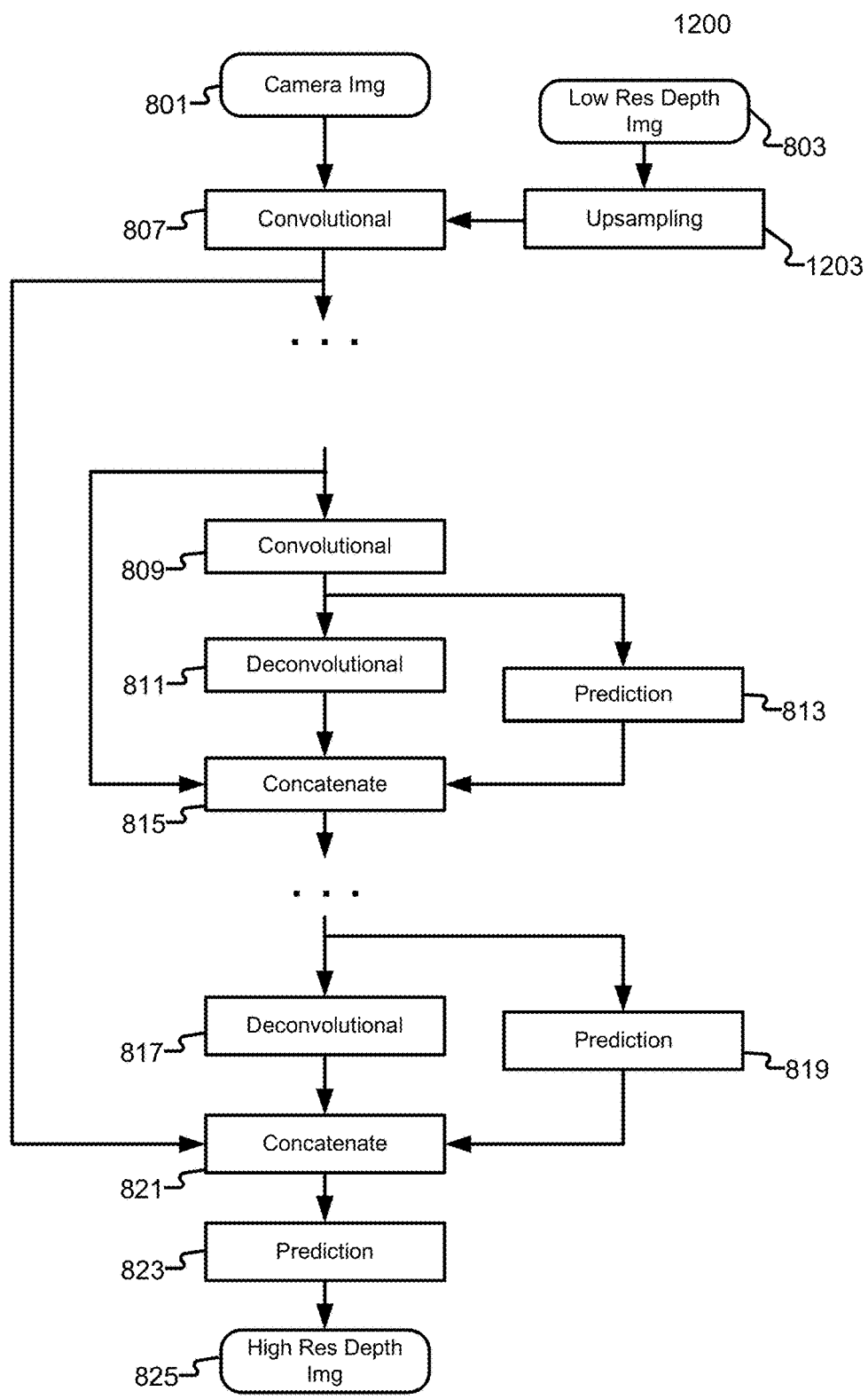
FIG. 12 is a diagram illustrating contracting (e.g., encoder/convolutional) and expanding (e.g., decoder/deconvolutional) layers of a convolutional neural network model according to one embodiment.

FIG. 12 is a diagram illustrating contracting (e.g., encoder/convolutional) and expanding (e.g., decoder/deconvolutional) layers of a CNN model according to one embodiment. CNN model 1200 receives camera image 801, low resolution depth image 803, and outputs high resolution depth image 825. Camera image 801 and low resolution depth image 803 may be image 703 and image 707 of FIG. 11B respectively. High resolution depth image 825 may be image 709 of FIG. 11B. CNN model 1200 can include various layers, such as, upsampling layer 1203, convolutional layers (807, 809), deconvolutional layers (811, 817), prediction layers (813, 819, 823), and concatenate layers (815, 821). FIG. 12 is similar to FIG. 8 in most aspects, except that a LIDAR image (e.g., low resolution depth image 803) is applied at an input layer of the CNN model and concatenate layer (e.g., layer 808 of FIG. 8) can be omitted.

Referring to FIG. 12, for example, camera image 801 can include a mono RGB camera image (e.g., 3 channels, 192 pixels by 96 pixels). Low resolution depth image 803 can include a single channel (i.e., grey scale) 48 pixels by 24 pixels LIDAR image (i.e., image 803 is one fourth the scale of image 801). Upsampling layer 1203 upsamples image 803 by a scale factor (i.e., four) to match an image scale of image 801 and outputs a one channel, 192 pixels by 96 pixels image. Upsampling layer 1203 may include an inpainting layer such that an inpainting algorithm is applied to reconstruct missing pixels that may be introduced by dark spots/artifacts perceived by a LIDAR detector, such as potholes, shadows, and/or weather phenomenons. The upsampled/inpainted image is combined with the mono RGB camera image (the image channels are added together) before it is received by convolutional layer 807. For example, the input image to layer 807 could be an image with 4 channels of size 192 pixels by 96 pixels.

Figure 13:
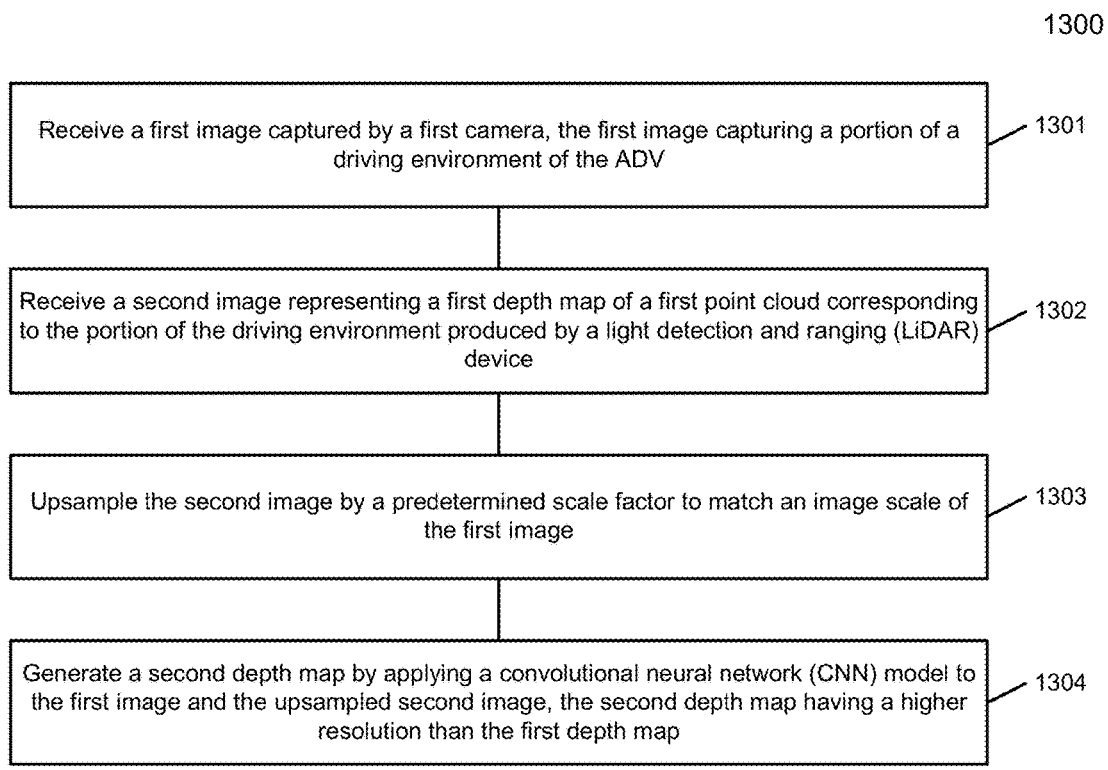
FIG. 13 is a flow diagram illustrating a method according to one embodiment.

FIG. 13 is a flow diagram illustrating a method according to one embodiment. Process 1300 may be performed by processing logic which may include software, hardware, or a combination thereof. For example, process 1300 may be performed by a point clouds module of an autonomous vehicle, such as point clouds module 307 of FIG. 3. Referring to FIG. 13, at block 1301, processing logic receives a first image captured by a first camera, the first image capturing a portion of a driving environment of the ADV. At block 1302, processing logic receives e a second image representing a first depth map of a first point cloud corresponding to the portion of the driving environment produced by a light detection and ranging (LiDAR) device. At block 1303, processing logic upsamples the second image by a predetermined scale factor to match an image scale of the first image. At block 1304, processing logic generates a second depth map by applying a convolutional neural network (CNN) model to the first image and the upsampled second image, the second depth map having a higher resolution than the first depth map, such that the second depth map represents a second point cloud utilized to perceive the driving environment surround the ADV.

In one embodiment, processing logic receives a third image captured by a second camera and generates the second depth map by applying the CNN model to the first image, the upsampled second image, and the third image. In one embodiment, the first image includes a cylindrical panorama image or a spherical panorama image. In another embodiment, the cylindrical panorama image or the spherical panorama image is generated based on a number of images captured by a number of camera devices. In another embodiment, processing logic reconstructs the second point cloud by projecting the second depth map into a 3-D space based on the cylindrical panorama image or the spherical panorama image.

In one embodiment, processing logic maps the upsampled second image onto an image plane of the first image. In one embodiment, the second depth map is generated by blending one or more generated depth maps such that the second depth map is a panorama map.

In one embodiment, the CNN model includes contractive layers where each contractive layer includes an encoder to downsample a respective input and expansive layers coupled to the contractive layers, where each expansive layer includes a decoder to upsample a respective input. In one embodiment, information of the contractive layers are fed forward to the expansive layers. In one embodiment, each of the expansive layers includes a prediction layer to predict a depth map for a subsequent layer. In one embodiment, upsampling the second image includes inpainting the second image.

Figure 14A:
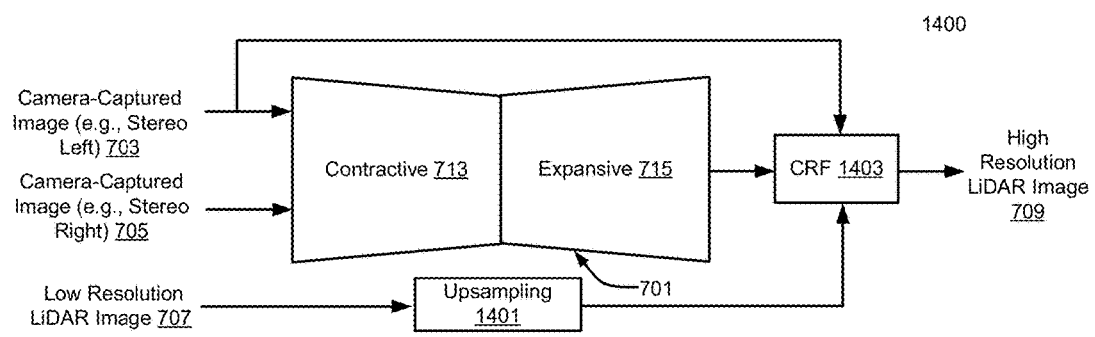
FIGS. 14A and 14B are block diagrams illustrating examples of depth map generations according to some embodiments.
Figure 14B:
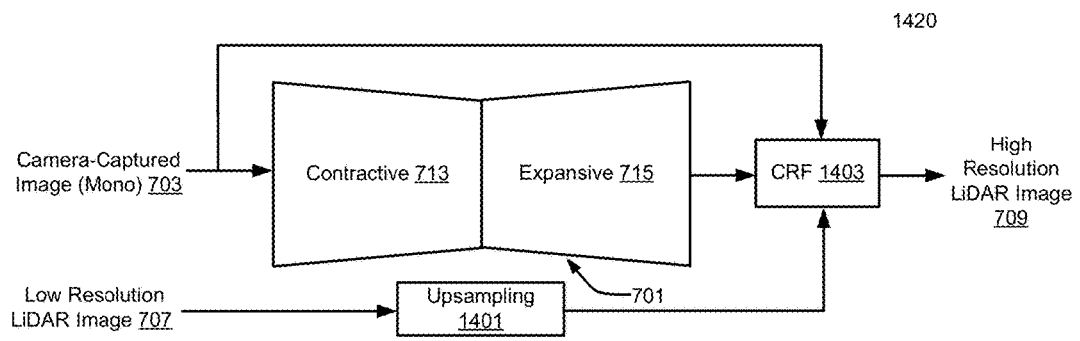

FIGS. 14A and 14B are block diagrams illustrating examples of convolutional neural network models according to some embodiments. Referring to FIG. 14A, in one embodiment, depth map generator 1400 can include upsampling module 1401 and CNN model 701. CNN model 701 (as part of neural network/CRF models 313) can include contractive (or encoder or convolutional layers) 713 and expansive (or decoder or deconvolutional layers) 715. FIG. 14B illustrates another exemplary embodiment depth map generator 1420. Depth map generators 1400 and 1420 may be performed by depth map module 405 of FIG. 4.

Referring to FIGS. 4 and 14B, generator 1420 receives a first image (e.g., camera-captured image 703) captured by a first camera(s), the first image capturing a portion of a driving environment of the ADV. Generator 1420 receives a second image, e.g., low resolution LIDAR image 707, representing a first depth map of a first point cloud corresponding to the portion of the driving environment produced by a light detection and ranging (LIDAR) device. Upsampling module 1401 upsamples the second image (e.g., image 707) by a predetermined scale factor to match an image scale of output image of CNN model 701. Generator 1420 determines a second depth map (e.g., output image of CNN model 701) by applying CNN model 701 to the first image (e.g., image 703). Generator 1420 generates a third depth map by applying a conditional random field (CRF) model (performed by CRF 1403, i.e., CRF 403 of FIG. 4), to the first image (e.g., image 703), the second image (e.g., image 707), and the second depth map (e.g., output image of CNN model 701), the third depth map having a higher resolution than the first depth map, such that the third depth map represents a second point cloud utilized to perceive the driving environment surround the ADV.

An optimization model, such as CRF, can be used to refine the depth/disparity estimation. According to one aspect, an end-to-end CNN model includes a CRF model consisting of three cost terms to optimize (or minimize) an overall cost function. For example, the CRF cost function may be:

$$CRF(x) = \Sigma_{i \in V} f_i(x_i) + \Sigma_{ij \in U} f_{ij}(x_{ij}) + \Sigma_{k \in W} g_k(x_k),$$

where $x_i$ is a disparity value of the ith pixel, V is the set of all the pixels, U is a set of image edges, and W is the set of grid points of a LIDAR image. The first two terms (e.g., $f_i(x_i)$ and $f_{ij}(x_{ij})$) can be an unary term stereo matching costs and a smoothness pairwise term estimating contrast sensitive edge weights, (i.e., image pixel smoothness/discontinuities), respectively.

For example, the CNN-CRF model can be configured such that the unary term can be determined based on a correlation (e.g., based on output of CNN model 701 of FIG. 14A) of a stereo left and a stereo right RGB images (such as image 703 and 705 of FIG. 14A), i.e., a stereo matching cost. In the alternative, the CNN-CRF model can be configured such that the unary term can be determined based on an "information gain" of disparity value of the ith pixel having contributions from all other disparity values (i.e., based on output of CNN model 701 of FIG. 14B) applied to a mono (or monocular) RGB image (such as image 703 of FIG. 14B).

The smoothness pairwise term may be determined based on disparity values of any pair of pixels representing smoothness/discontinuities of an estimated depth map (e.g., based on output of CNN model 701). Examples of such cost terms is defined in Knobelreiter et al., "End-to-End Training of Hybrid CNN-CRF Models for Stereo", (November 2016), which is incorporated herein by reference in its entirety. In an alternative embodiment, the cost terms may be information gains defined in Cao et al., "Estimating Depth from Monocular Images as Classification Using Deep Fully Convolutional Residual Networks", (May 2016), which is incorporated herein by reference in its entirety. The third term (e.g., g(x)) may be a cost term representing an error term of the estimated Lidar image with respect to a low resolution LIDAR image (i.e., based on output of CNN model 701 and output of upsampling 1401 of FIG. 14A-14B).

In one embodiment, g(x) may be defined as $$g(x) = \begin{cases} 0, & \text{if } |x_k - d_k| < \text{threshold} \\ |x_k - d_k|, & \text{otherwise} \end{cases}$$

where threshold is a predetermined threshold such as 1.0 or 2.0, $x_i$ is a disparity value of the ith pixel, and $d_k$ is low resolution Lidar image disparity value. Note, the f(x) and g(x) terms may include weight terms based on input image 703 that are applied to input images pixel by pixel to highlight image contrasts. For example, CRF 1403 can apply weight terms to f(x) and/or g(x) based on input RGB image 703 of FIG. 14A-14B.

In one embodiment, camera-captured image 703 and LIDAR image 707 are panorama images, such as a cylindrical or a spherical panorama image. In another embodiment, camera-captured image 703 and LIDAR image 707 are perspective images. The camera configuration to capture image 703 may include any cameras of camera configurations of FIGS. 5D-5F.

For the LIDAR configuration, LIDAR image 707 is generated by mapping 3-D point clouds captured by a LIDAR detector from a 3-D space/plane followed by a conversion of the 3-D point clouds to a 2-D image plane. Here, the 2-D image plane of image 707 can be the same image plane as image 703. In another embodiment, LIDAR image 707 may be a perspective LIDAR image that corresponds to perspective camera-captured image 703. As previously described, CNN model 701 can be applied sequentially to several perspective pairs of image 703 and image 707 to generate perspective LIDAR images. In another embodiment, several CNN models can be concurrently applied to multiples of perspective pairs of image 703 and image 707 to generate multiples of perspective LIDAR images for panorama image generation.

Referring to FIGS. 4 and 14A, in another embodiment, generator 1400 receives a third image, e.g., camera-captured image 705, captured by a second camera(s). Generator 1400 determines the second depth map by applying the CNN model to the first image and the third image. A CRF model is applied by CRF 1403 to the second depth map to generate a third depth map. Here, images 703-705 can be a left and right stereo images (e.g., images captured by configuration 514 of FIG. 5E) or a vertical top and bottom stereo images (e.g., images captured by configuration 524 of FIG. 5F).

Figure 15:
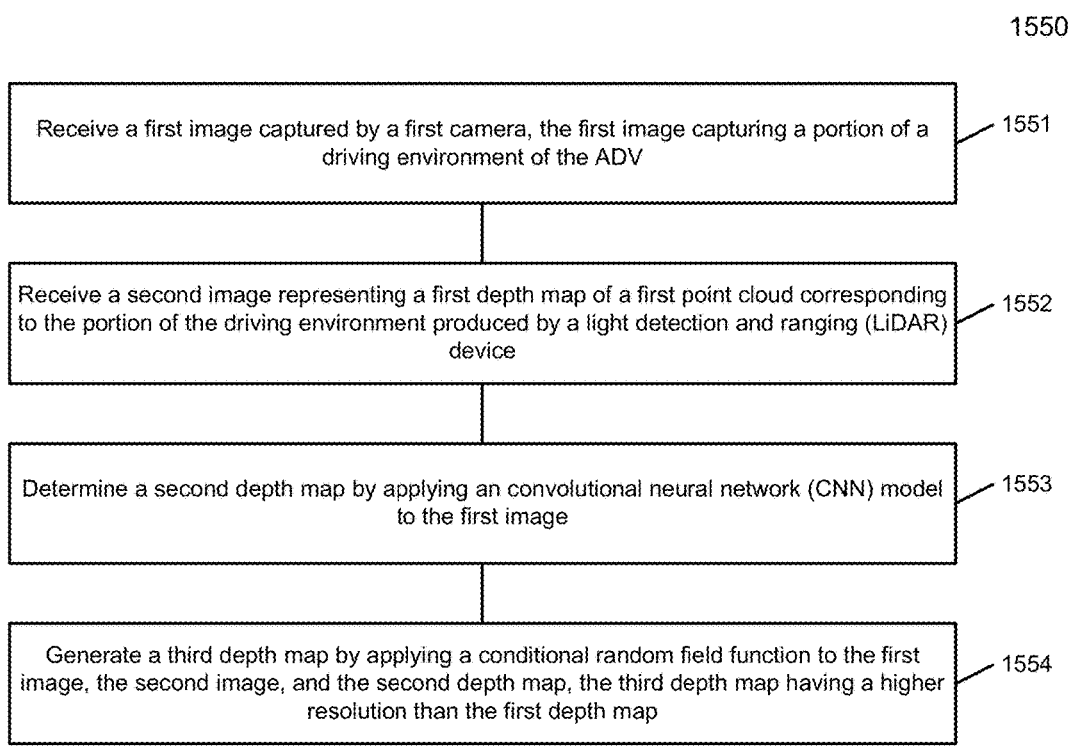
FIG. 15 is a flow diagram illustrating a method according to one embodiment.

FIG. 15 is a flow diagram illustrating a method according to one embodiment. Process 1550 may be performed by processing logic which may include software, hardware, or a combination thereof. For example, process 1550 may be performed by a point clouds module of an autonomous vehicle, such as point clouds module 307 of FIG. 3. Referring to FIG. 15, at block 1551, processing logic receives a first image captured by a first camera, the first image capturing a portion of a driving environment of the ADV. At block 1552, processing logic receives a second image representing a first depth map of a first point cloud corresponding to the portion of the driving environment produced by a light detection and ranging (LiDAR) device. In block 1553, processing logic determines a second depth map by applying a convolutional neural network (CNN) model to the first image. In block 1554, processing logic generates a third depth map by applying a conditional random field function to the first image, the second image, and the second depth map, the third depth map having a higher resolution than the first depth map, such that the third depth map represents a second point cloud perceiving the driving environment surrounding the ADV.

In one embodiment, processing logic receives a third image captured by a second camera and generates the third depth map by applying the CNN model to the first image and the third image. In one embodiment, the first image includes a cylindrical panorama image or a spherical panorama image. In another embodiment, the cylindrical panorama image or the spherical panorama image is generated based on a number of images captured by a number of camera devices. In another embodiment, processing logic reconstructs the second point cloud by projecting the third depth map into a 3-D space based on the cylindrical panorama image or the spherical panorama image.

In one embodiment, processing logic maps the third image onto an image plane of the first image. In one embodiment, the third depth map is generated by blending one or more generated depth maps such that the second depth map is a panorama map.

In one embodiment, the CNN model includes contractive layers where each contractive layer includes an encoder to downsample a respective input and expansive layers coupled to the contractive layers, where each expansive layer includes a decoder to upsample a respective input. In one embodiment, information of the contractive layers are fed forward to the expansive layers. In one embodiment, each of the expansive layers includes a prediction layer to predict a depth map for a subsequent layer.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 16:
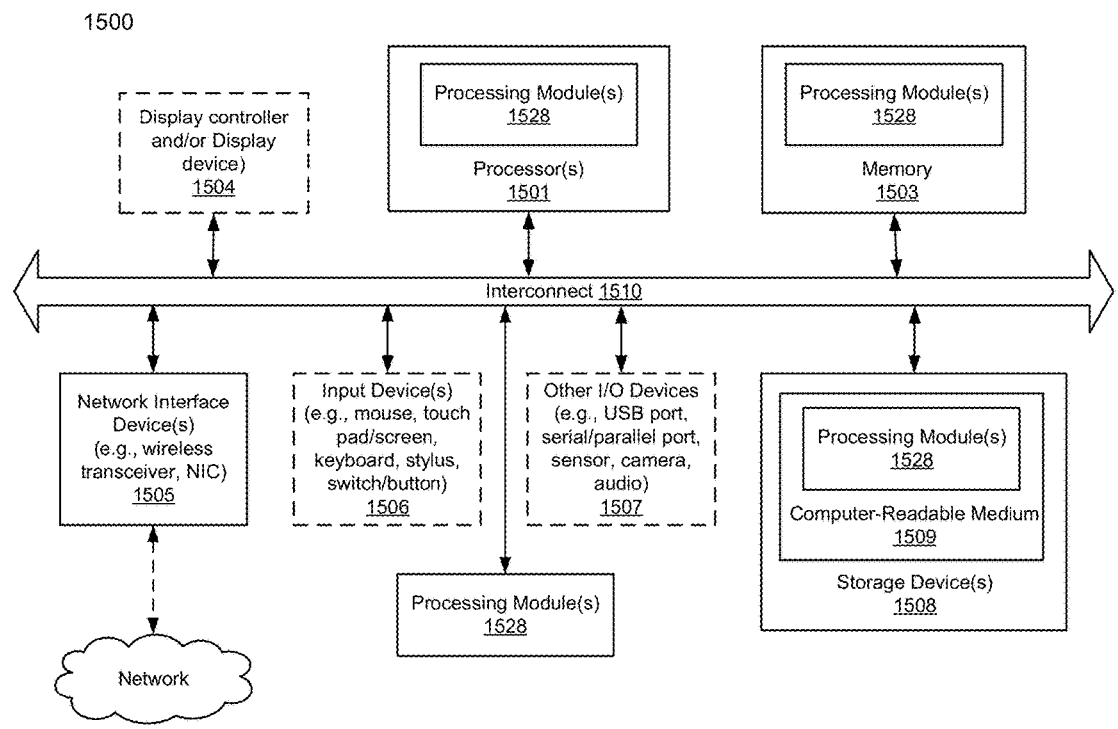
FIG. 16 is a block diagram illustrating a data processing system according to one embodiment.

FIG. 16 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and high resolution point clouds module 307. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
    receiving a first image captured by a first camera, the first image capturing a portion of a driving environment of the ADV;
    receiving a second image representing a first depth map of a first point cloud corresponding to the portion of the driving environment produced by a light detection and ranging (LiDAR) device;
    downsampling the second image by a predetermined scale factor until a resolution of the second image reaches a predetermined threshold; and
    generating a second depth map by applying a convolutional neural network (CNN) model to the first image and the downsampled second image, the second depth map having a higher resolution than the first depth map, wherein the second depth map represents a second point cloud perceiving the driving environment surrounding the ADV.

2. The method of claim 1, further comprising:
    receiving a third image captured by a second camera; and
    generating the second depth map by applying the CNN model to the first image, the downsampled second image, and the third image.

3. The method of claim 1, wherein the first image comprises a cylindrical panorama image or a spherical panorama image.

4. The method of claim 3, wherein the cylindrical panorama image or the spherical panorama image is generated based on a plurality of images captured by a plurality of camera devices.

5. The method of claim 3, further comprising reconstructing the second point cloud by projecting the second depth map into a three dimensional (3-D) space based on the cylindrical panorama image or the spherical panorama image.

6. The method of claim 1, further comprising mapping the downsampled second image onto an image plane of the first image.

7. The method of claim 6, wherein the second depth map is generated by blending one or more generated depth maps, wherein the second depth map is a panorama map.

8. The method of claim 1, wherein the CNN model comprises:
    a plurality of contractive layers, wherein each contractive layer includes an encoder to downsample a respective input; and
    a plurality of expansive layers coupled to the plurality of contractive layers, wherein each expansive layer includes a decoder to upsample a respective input.

9. The method of claim 8, wherein information of the plurality of contractive layers are fed forward to the plurality of expansive layers.

10. The method of claim 8, wherein each of the plurality of expansive layers includes a prediction layer to predict a depth map for a subsequent layer.

11. A non-transitory machine-readable medium having instructions stored therein, which when executed by a processor, cause the processor to perform operations, the operations comprising:
    receiving a first image captured by a first camera, the first image capturing a portion of a driving environment of an autonomous driving vehicle (ADV);
    receiving a second image representing a first depth map of a first point cloud corresponding to the portion of the driving environment produced by a light detection and ranging (LiDAR) device;
    downsampling the second image by a predetermined scale factor until a resolution of the second image reaches a predetermined threshold; and
    generating a second depth map by applying a convolutional neural network (CNN) model to the first image and the downsampled second image, the second depth map having a higher resolution than the first depth map, wherein the second depth map represents a second point cloud perceiving the driving environment surrounding the ADV.

12. The non-transitory machine-readable medium of claim 11, further comprising:

receiving a third image captured by a second camera; and
generating the second depth map by applying the CNN model to the first image, the downsampled second image, and the third image.

13. The non-transitory machine-readable medium of claim 11, wherein the first image comprises a cylindrical panorama image or a spherical panorama image.

14. The non-transitory machine-readable medium of claim 13, wherein the cylindrical panorama image or the spherical panorama image is generated based on a plurality of images captured by a plurality of camera devices.

15. The non-transitory machine-readable medium of claim 13, further comprising reconstructing the second point cloud by projecting the second depth map into a three dimensional (3-D) space based on the cylindrical panorama image or the spherical panorama image.

16. A data processing system, comprising:
a processor; and
a memory coupled to the processor to store instructions, which when executed by the processor, cause the processor to perform operations, the operations including
receiving a first image captured by a first camera, the first image capturing a portion of a driving environment of an autonomous driving vehicle (ADV);
receiving a second image representing a first depth map of a first point cloud corresponding to the portion of the driving environment produced by a light detection and ranging (LiDAR) device;
downsampling the second image by a predetermined scale factor until a resolution of the second image reaches a predetermined threshold; and
generating a second depth map by applying a convolutional neural network (CNN) model to the first image and the downsampled second image, the second depth map having a higher resolution than the first depth map, wherein the second depth map represents a second point cloud perceiving the driving environment surrounding the ADV.

17. The system of claim 16, further comprising:
receiving a third image captured by a second camera; and
generating the second depth map by applying the CNN model to the first image, the downsampled second image, and the third image.

18. The system of claim 16, wherein the first image comprises a cylindrical panorama image or a spherical panorama image.

19. The system of claim 18, wherein the cylindrical panorama image or the spherical panorama image is generated based on a plurality of images captured by a plurality of camera devices.

20. The system of claim 19, further comprising reconstructing the second point cloud by projecting the second depth map into a three dimensional (3-D) space based on the cylindrical panorama image or the spherical panorama image.

* * * * *